Nov. 16, 1965    H. HERMANN    3,217,908
MANIPULATOR ARM
Filed Jan. 21, 1963    3 Sheets-Sheet 1

United States Patent Office 3,217,908
Patented Nov. 16, 1965

3,217,908
MANIPULATOR ARM
Horst Hermann, Leopoldsburg, Germany, assignor to European Atomic Energy Community
Filed Jan. 21, 1963, Ser. No. 252,908
Claims priority, application France, Jan. 23, 1962, 885,572
11 Claims. (Cl. 214—34)

This invention relates to a retractable manipulator system especially though not exclusively useful in nuclear installations for the remote handling of such equipment components as nuclear fuel elements, irradiated samples and the like.

While the advantages of the invention will be described with particular reference to its uses in the nuclear field, it is to be understood that this is not to be construed as limiting the scope of applicability of the improved manipulator system which may find valuable uses in various other fields of engineering.

Conventional manipulators for the remote handling of objects in potentially radioactive surroundings usually comprise rigid, tubular arms fitted at their outer end with prehensile means capable of controllable universal movement. Often such arms are required to be of considerable length, of the order of ten meters or more, so that the extension and retraction of the arm raises considerable mechanical and storage space problems. For example, the vertical manipulator arms used to insert the nuclear fuel elements into the fuel channels in certain reactors equipped with overhead loading means are required to extend the full distance from the overhead loading facilities down to the reactor core so that in the retracted condition such arms have to protrude an equivalent vertical distance above the loading installations, greatly increasing the vertical space requirements of the reactor. A similar problem is encountered in connection with the manipulation of sample materials to be inserted into the core for experimental irradiation. The problem is further complicated by the necessity of providing such manipulator arms of continuously recessed or tubular configuration throughout their length for the insertion and withdrawal of components therethrough.

Objects of this invention include the provision of an improved manipulator system which can be extended to a considerable adjustable length as required for a given handling operation, and then retracted when not in use to a coiled condition in which it takes up a minimum of space. An object is to provide a manipulator system in two parts, each part when separate from the other being flexible so as to be readily stowable in a limited volume of space as by coiling or otherwise, and both parts cooperating in use so as to interlock when extended into a fully rigid and undeformable arm structure; related objects are to provide such a system wherein the two parts cooperate when interlocked to provide a rigid arm of tubular shape, and further to provide improved interlocking means whereby said two parts will automatically assume their interlocked relation on being fed out to their extended condition and will automatically disengage from each other on being moved into the opposite direction to their retracted, e.g., coiled, condition. Other objects will appear.

The invention in an essential aspect provides a manipulator system comprising a pair of chain-like assemblies each having a series of interpivoted link members, means for feeding out both assemblies concurrently in one direction over respective paths converging towards a common line along which the assemblies are substantially coincident, and for retracting the assemblies in the opposite direction away from said line, and disengageably interengageable means on link members of the respective assemblies interengageable on coincidence of the assemblies along said line to interlock both assemblies into a rigid undeformable manipulator arm and disengageable on separation of said assemblies as the latter are retracted in said opposite direction.

In a preferred embodiment, the chain-like assemblies are coilable in respective drums or the like, and are uncoiled to feed out the assemblies and coiled to retract them. Preferably also, the link members of the respective assemblies are of such cross sectional shape as to cooperate in providing a substantially tubular arm structure when the assemblies assume their coincident condition.

An exemplary embodiment of the invention will now be described for purposes of illustration but not of limitation with reference to the accompanying drawing, wherein.

Figure 1:
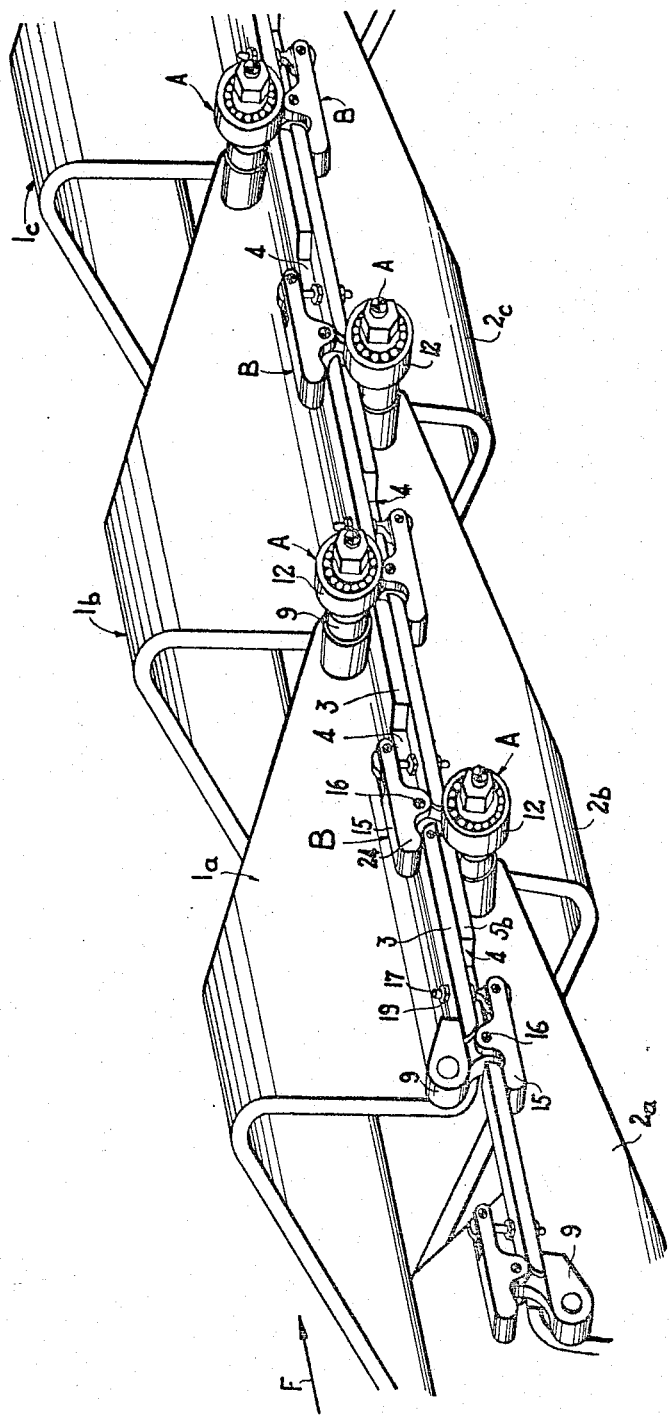
FIG. 1 is a perspective view of a section of manipulator arm according to the invention with the two chain-like assemblies thereof being in their assembled and interlocked condition.

Referring to FIG. 1, a manipulating system according to the invention comprises two generally similar chain-like assemblies of interpivoted shell-like link members in opposed, and longitudinally displaced relation. Thus the upper chain assembly comprises the interpivoted link members 1a, 1b, 1c, and the lower chain assembly comprises the interpivoted link members 2a, 2b, 2c. In each of the two chains, adjacent link members are interconnected by pivot assemblies generally designated A. Moreover, each link member of either chain (e.g., member 1a) is adapted to be releasably coupled with both adjacent link members of the other chain (e.g., members 2a and 2b) by way of an automatically releasable coupling device generally designated B. As already noted the two chains of shell-like link members are longitudinally displaced as between one another, by an amount equivalent to half the length of a link member, so that the adjacent ends of a link member in one chain lie substantially opposite to the longitudinal midpoint of a link member in the opposite chain.

Figure 2:
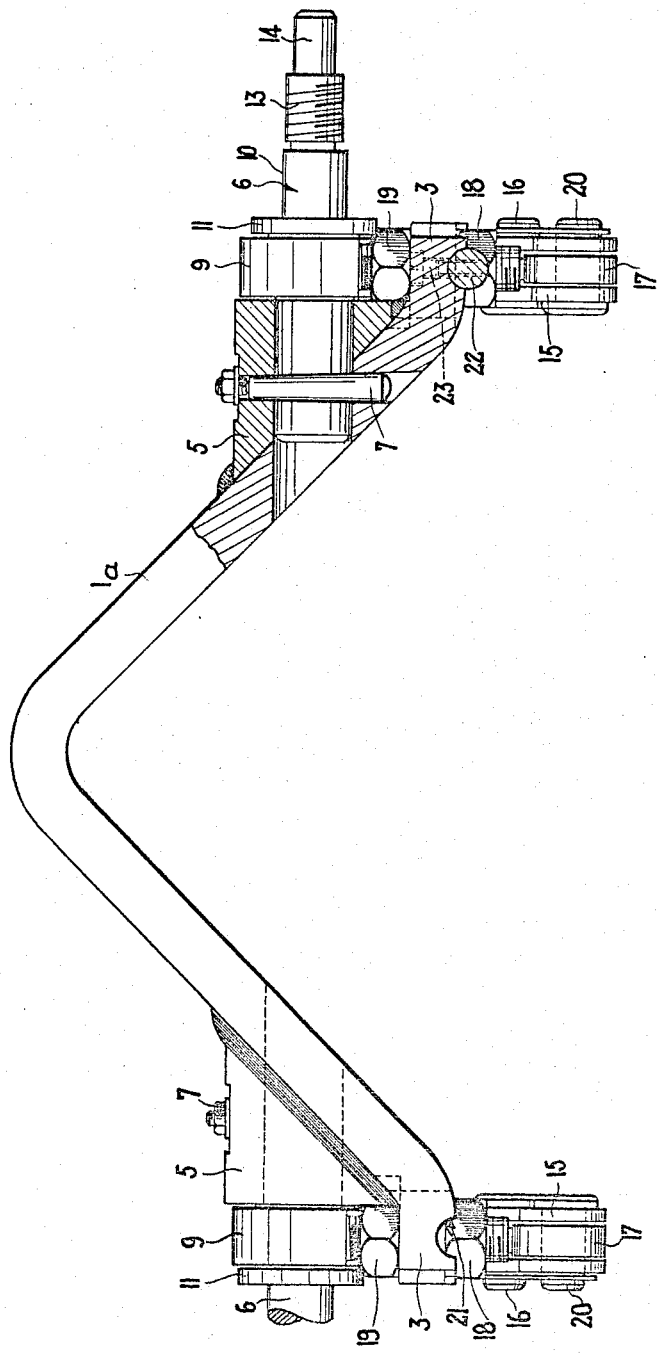
FIG. 2 is a transverse view of one shell-like link member of one of the chain-like assemblies, as seen in the direction indicated by arrow F in FIG. 1, with part of the structure being shown in cross section on a plane extending through the axis of the pivot assembly.
Figure 3:
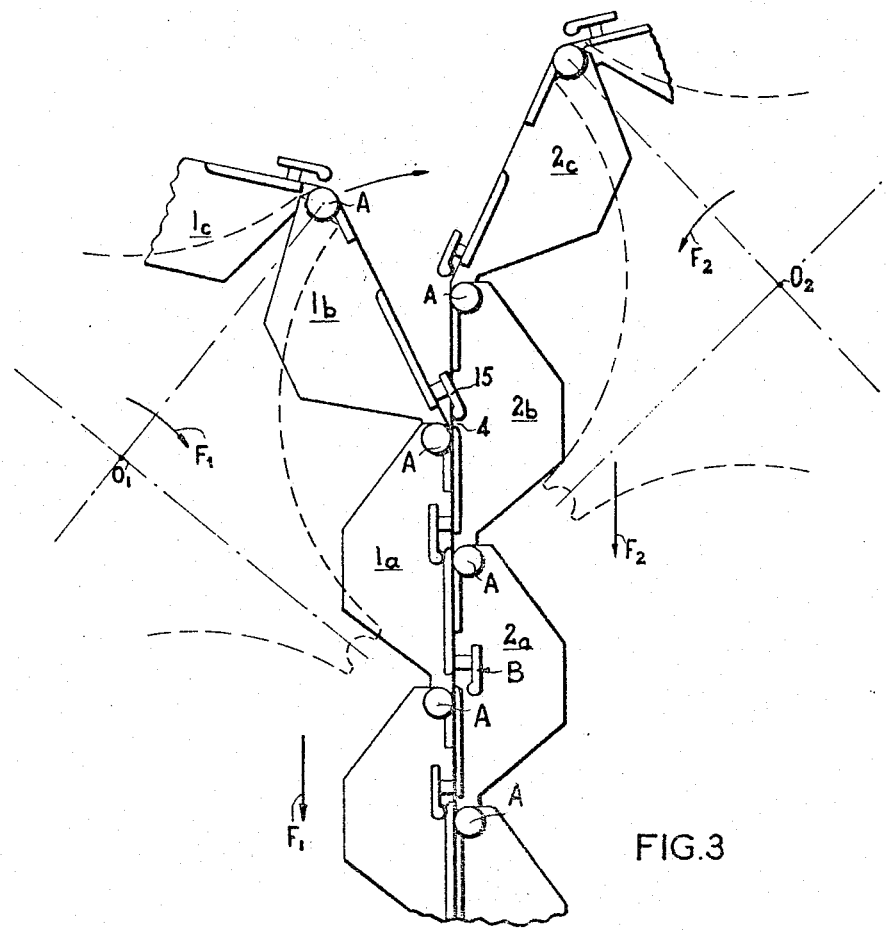
FIG. 3 is a simplified view of the assemblies being fed out to the extended condition of the system.

Each shell-like link member, say 1a, comprises a sheet element bent to a V shape in transverse cross section with outwardly jutting side flanges 3, as clearly shown in FIG. 2. The longitudinal contour of the shaped members is trapezoidal as best seen in FIG. 3, with the larger base of the trapezoid being the base provided with the flanges 3. Each flange 3 is formed with a rectangular cutout 4 over an intermediate part of its length for a reason that will appear later. The pivot assembly A interconnecting adjacent shell members in each chain will now be described with reference to FIGS. 1 and 2, especially the sectional view at the right of FIG. 2.

Secured, e.g., welded, to the rear end (righthand end in FIG. 1) of each shell member at each side of it is a pair of transversely aligned sleeves 5. Extending in each sleeve and blocked therein by means of a taper cotter pin 7 is a pivot shaft 6 projecting laterally outward from the shell member. Each pivot shaft 6 is formed with a first journal surface around which is rotatably positioned a bearing ring 9 fixedly secured to and projecting from the front end (lefthand end in FIG. 1) of the flange 3 pertaining to the shell member immediately adjacent to and rearwardly of the shell member under consideration. Thus, the pivot 6 forming part of shell member 1a (FIG. 1) rotatably supports the bearing ring 9 projecting from the front end of the shell member 1b immediately behind it (to the right of it in FIG. 1), and similarly all the shell members in each chain are pivotally interconnected by the rotatable cooperation between a pivot 6 on each shell member with a bearing ring 9 of the next following member.

Beyond the bearing surface on which the ring 9 is journalled each pivot axle 6 comprises a retainer flange 11 followed by a further bearing surface 10 on which is journalled a roller 12 (not shown in FIG. 2) such as a suitable ball bearing retained by means of a nut screwed about a threaded portion 13 provided on pivot 6 beyond surface 10. The rollers 12 cooperate with guide rails not shown, during displacement of the chain assemblies for coupling and uncoupling them with respect to each other, and when winding the chains on and off their supporting drums as will be later understood. Each axle 6 finally includes a projecting end nose 14 serving as a guide during said winding operations.

The coupling means B, provided between each shell member of one chain assembly and the adjacent two shell members of the opposite chain assembly, essentially comprises a two-armed latch lever 15 pivotally connected to each side flange of each shell member near the front end of said member, i.e., the same end as that on which the bearing collars or rings 9 are mounted. Each lever 15 has its midpoint pivoted by means of a pin 16 to the free end of a lug projecting from the front end of the flange 3 in a direction towards the opposite chain of shell members, the length of said lug being such that it can extend through the cutout 4 formed in the flange 3 of the adjacent shell member of the opposite chain, so as to support its lever 15 with one (the forward one) of its arms in engagement with a surface of said flange of the adjacent shell member of the opposite chain. Thus, it will be noted that the lever 15 overlying the leftward-most roller 12 shown in FIG. 1, is pivoted at 16 to a lug projecting upwardly from the front (or left-hand) end of the shell member 2b of the lower chain, said lug extending through the cutout 4 in flange 3 of shell member 1a of the upper chain, and engaging with the under surface of its forward arm 24 an upper surface of said flange. Means are provided for adjusting the inclination angle of each lever 15 about its pivot 16, and comprise a screw 17 having its head pivoted at 20 in a forked part provided at the rear end of the lever, and extending through a hole formed in the flange 3, with a pair of lock nuts 18 and 19 threaded on the screw on opposite sides of said flange to block the lever at a selected inclination angle.

With the manipulator arm in the assembled condition shown in FIG. 1, it will be noted that each lever 15 serves to apply the flange 3 of the shell member on which it is mounted (e.g. 2b) as well as the flange 3 of the member preceding it in the same chain (e.g. 2a) into engagement against the flange 3 of that shell member (e.g. 1a) of the opposite chain which overlaps both first mentioned shell members. In other words each latching lever 15 cooperates with the flange 3 of the preceding shell member in the same chain as that on which said lever is mounted, to provide the interpivoted jaws of a clamp which grips the flange of the overlapping shell member of the opposite chain. It will be seen that when a latching lever 15 has been brought to a position where it projects through the cutout 4 in a flange of the opposite chain, it automatically serves to interconnect three adjacent shell members into a rigid, undeformable unit.

As shown in FIG. 2, the underface of each flange 3 is formed with a semi-circular groove 21, and secured in this groove on one side of each shell member is a cylindrical rod 22 which projects out of the groove to cooperate with a similar, but empty, groove formed in an opposite shell member so as to prevent lateral displacement between said members. A screw 23 is shown for securing the rod 22 in its groove 21.

In use of the manipulator assembly described (see FIG. 3), it will be understood that both chains of shell members when in idle condition are wound in separate coil drums, not shown, the trapezoidal longitudinal contour of the shell members enabling them to be coiled neatly within the drums. To extend and assemble the manipulator arm, the coils are rotated in opposite directions (as indicated by the arrows F1 and F2 in FIG. 3) so that the two chains are uncoiled and moved towards each other. In this movement each shell member in each chain, e.g. member 1b, first follows an arcuate path about the centre $O_1$ over an arc of about 90° and thereafter continues to advance over a straight-line path. In the arrangement shown in FIG. 3, the relative disposition of the paths followed by the link members of each chain assembly during this uncoiling operation is such that each member (e.g. 1b) of the left hand chain as it terminates the initial arcuate segment of its path approaches a member (e.g. 2b) of the opposite chain which is already positioned on its straight-line path segment and the movements are so synchronized that at the point of tangency between the two paths the latching levers 15 projecting from the front end of member 1b find before them and penetrate the cutouts 4 in the flanges of the member 2b. As member 1b enters on the rectilinear segment of its path its latching levers 15 then engage the flanges 3 of member 2b so as to cause the interlocking engagement between the three members 1b, 1a and 2b to be effected in the manner earlier described. Consequently, beyond the point of tangency between the two paths of the respective chains, both chains of members are rigidly coupled to provide a straight, undeformable, tubular manipulator arm. The feeding-out of the coils can be continued until both chains have been completely uncoiled to provide a straight arm of maximum extent.

To retract the arm the coils are rotated in the opposite directions. As each latching lever 15 reaches the point of separation between the paths of the respective chains, it smoothly withdraws by an oblique movement from out of the cutout 4 in which it was engaged, thereby uncoupling the chains and allowing them to be taken up into the coils in the related drums. The endmost shell members in both chains may be of special shape, e.g. cylindrical, and equipped with any suitable coupling means for one or more tools.

It will thus be apparent that the invention has provided an extremely practical manipulator system whereby an e.g. tubular manipulator arm of great length and of extremely rigid and undeformable characteristics can be made available when required and, when not in use, retracted to a relatively compact condition as a pair of separate coils, with the coupling and uncoupling operations between the two halves of the arm being performed smoothly and automatically by simple rotation of the coils in which the two chain-like assemblies are stowed.

Suitable apparatus for coiling and uncoiling the chain-like assemblies is described in co-pending United States application Serial No. 253,190, filed January 22, 1963, now Patent No. 3,197,041, to which reference may be had for a more detailed description thereof. For the purposes of the present application it is sufficient to indicate that the means for feeding the chain assemblies into and out of their coils may include Geneva-type gears, as indicated in phantom in FIG. 3, having their centers at $O_1$ and $O_2$ respectively, and engageable with the link pivots such as A to produce intermittent advance of said pivots and of the attached links on uniform rotation of said gears about their respective centers. It will be understood, however, that other suitable feed mechanisms, continuous or intermittent in character, may be used.

It will be apparent that various changes may be made in the constructional details illustrated and described without exceeding the scope of the invention. Thus the configuration of the individual shell-like link members of the respective assemblies, especially in transverse cross-section, may be varied as required to suit specific purposes. The means interlocking the link members of the respective assemblies into a rigid undeformable structure as the assemblies reach their substantially coinciding conditions may likewise assume various forms other than the latching levers and cutouts used in the exemplary embodiment described.

What I claim is:

1. A manipulator system comprising in combination a pair of chain-like assemblies each having a series of inter-pivoted part-tubular link members having their concavities directed towards each other between said assemblies, means for feeding out said assemblies concurrently in one direction with the link members of one of said assemblies overlapping the link members of the other of said assemblies over converging paths and towards a common line along which said concavities of said link members of said assemblies cooperate to define a substantially tubular configuration and for retracting said assemblies in the opposite direction away from said line, and disengageably interengageable means on said link members inter-engageable as said members approach said line to interlock a given link member of one of said assemblies with two link members of the other of said assemblies overlapped by said given link member to provide an undeformable three link member structure.

2. A manipulator system comprising in combination a pair of chain-like assemblies each having a series of inter-pivoted part-tubular link members, flat longitudinal side flanges on said members inter-engageable as between opposite members of said assemblies, means for feeding out said assemblies concurrently in one direction with said link members of one of said assemblies overlapping said link members of the other of said assemblies over converging paths toward a common line along which said link members of said assemblies cooperate to define a substantially tubular configuration, means for retracting said assemblies in an opposite direction away from said line and disengageably inter-engageable means on said link members inter-engageable as said members approach said line to interlock said assemblies into a rigid tubular arm and disengageable as said members separate on retraction of said assemblies, said interengageable means comprising a latching element mounted adjacent an end of a given link member of one of said assemblies projecting through a cut-out formed intermediate the length of said flange of an adjacent link member of the other of said assemblies and interlockingly engageable with a surface of said flange and with a surface of said flange of a link member of said first assembly preceding said given link member adjacent an end thereof.

3. The system claimed in claim 1, wherein said interengageable means comprise a latching element mounted adjacent a forward end of a link member of one assembly, interlockingly engageable with a surface portion positioned intermediate the length of a link member of the other assembly and with a surface portion positioned adjacent a rear end of the link member of said first assembly preceding said first-mentioned link member.

4. The system claimed in claim 1, wherein said link members have flat longitudinal surfaces interengageable as between opposite members of the respective assemblies in said coincident condition of the assemblies.

5. The system claimed in claim 2, including means for adjusting the position of said latching element relative to the link member on which it is mounted.

6. The system claimed in claim 1, having a latching element on each member of each assembly.

7. The system claimed in claim 2, wherein each member of each assembly has a pair of latching elements mounted on opposite sides adjacent the forward end thereof and projectable through cutouts formed in both flanges of each member of the other assembly.

8. The system claimed in claim 1, including further means on link members of the respective assemblies interengageable in said coincident condition of the assemblies to prevent lateral relative displacement therebetween.

9. The system claimed in claim 1, wherein link members are formed with end surfaces sloping at an angle to the general direction of the assemblies where aligned on said common line to permit coiling of each assembly in the retracted condition thereof.

10. The system claimed in claim 1, including means for interpivoting adjacent link members of each assembly said means comprising pivots projecting laterally from opposite sides adjacent a rear end of each member and bearing rings projecting from a forward end of an adjacent link member and rotatably journalled around said pivots.

11. A retractable, variable-length tubular manipulator arm comprising in combination a pair of coilable chain-like assemblies of interpivoted part-tubular link members in the form of channels having their concavities directed toward each other as between said assemblies; drum means supporting the respective assemblies in coiled conditions; means for rotating the drum means in one direction to uncoil both assemblies concurrently to feed them out over converging paths to bring the assemblies into substantial coincidence on a common line whereupon the concavities of the link members of both assemblies cooperate to define a substantially tubular rectilinear arm and in an opposite direction to coil the assemblies and draw them away from said line; and disengageably interengageable means on the link members of both assemblies interengageable on coincidence of the assemblies on said line to interlock the link members thereof into a rigid undeformable tubular arm of variable length and disengageable on separation of the assemblies on retraction thereof to permit their being coiled in said drum means.

References Cited by the Examiner

UNITED STATES PATENTS 2,574,657   11/1951   Pierce.
2,643,745   6/1953   Olszewski.
3,082,893   3/1963   Hollings et al. _____ 214—34 X GERALD M. FORLENZA, *Primary Examiner.*

HUGO O. SCHULZ, *Examiner.*